United States Patent [19]
Burke

[11] 3,820,880
[45] June 28, 1974

[54] ADJUSTABLE HINGE STRUCTURE FOR EYEGLASSES

[76] Inventor: Mary Burke, Rt. 2, Tampico, Ill. 61283

[22] Filed: Mar. 19, 1973

[21] Appl. No.: 342,686

[52] U.S. Cl.............. 351/121, 2/14 T, 16/128 A, 16/131, 16/134, 351/153
[51] Int. Cl.............................................. G02c 5/22
[58] Field of Search .......... 351/121, 153; 16/128 A, 16/DIG. 13, 131, 134; 2/14 T

[56] References Cited
UNITED STATES PATENTS
2,756,632  7/1956  Parsell .............................. 351/121

Primary Examiner—Paul A. Sacher
Attorney, Agent, or Firm—Elmer L. Zwickel

[57] ABSTRACT

An adjustable hinge structure for eyeglass frame temples adapting the temples for adjustment toward and away from the sides of the head.

2 Claims, 4 Drawing Figures

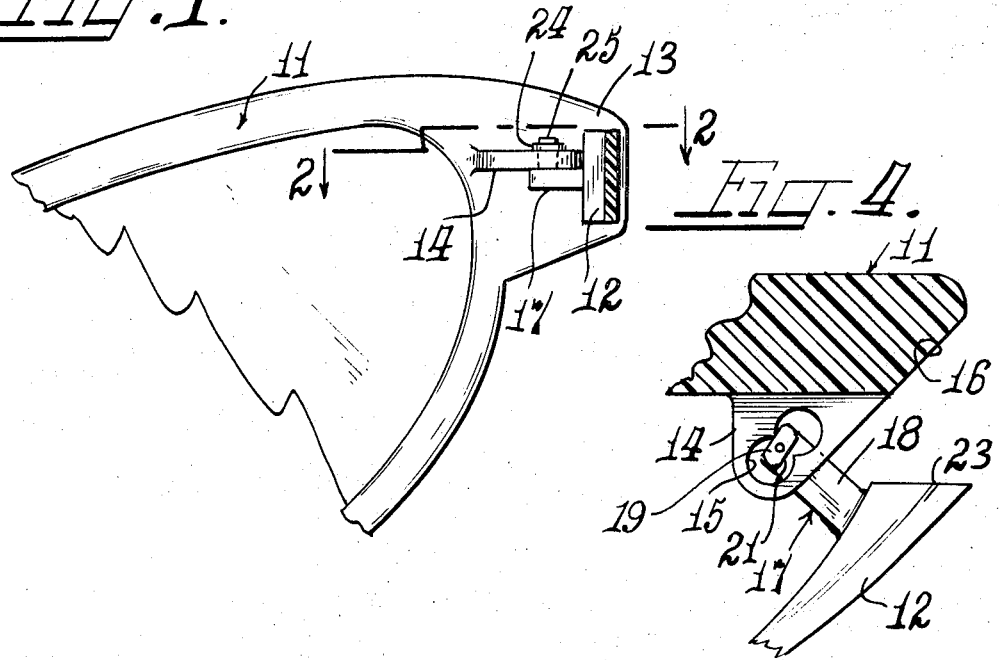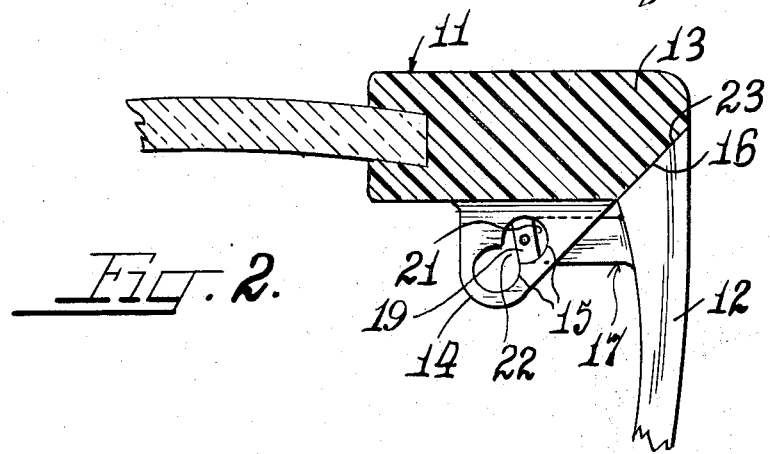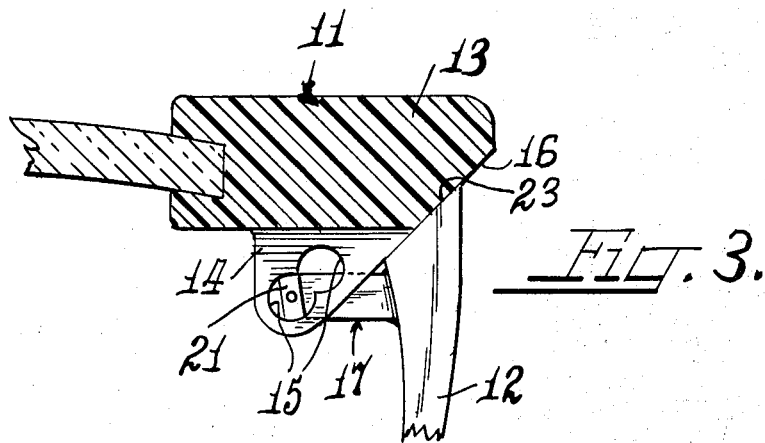

ADJUSTABLE HINGE STRUCTURE FOR EYEGLASSES

The invention relates to improvements in spectacle frames and is more particularly concerned with the novel adjustable hinge mounting of the temples on the frontal lens portion.

In spectacle frames of general construction it is common practice to utilize temples which are constructed of plastic material and are hingedly connected to the frontal lens portion so as to snugly embrace the sides of the head of the wearer. Frequently, there are occasions when the temples fail, because of head size or deformation of the temples, to afford the desired contact pressure on the sides of the head with the result that the eyeglasses do not fit properly.

The foregoing objectionable characteristic is overcome, easily and quickly, by the use of a hinge structure of the character herein described. Specifically, the hinge structure for attaching each temple to the respective end portion of the frontal lens portion is comprised of two parts hingedly and slidably connected together so as to be capable of ready adjustment for the purpose of locating the temples closer to or further away from the sides of the head.

It is therefore an object of the invention to provide an eyeglass frame embodying novel hinge elements for the temples.

Another object is to provide a novelly constructed, slidably adjustable hinge element.

Another object is to provide a hinge element wherein one of its components comprises a stud-like part and the other component is comprised of a dual socket adapted to receive the stud-like part in either one of two positions of adjustment.

Another object is to provide a hinge structure of the character referred to which is not expensive or difficult to construct and which is very efficient in use.

Other objects and advantages of the invention will become apparent with reference to the following description and accompanying drawing.

In the drawings:

FIG. 1 is an elevational view of one of the two like end portions of a spectacle frame, showing the temple in section.

FIG. 2 is a horizontal sectional view, on an enlarged scale, of the spectacle end portion, taken substantially on line 2—2 of FIG. 1, showing the hinge structure in elevation, but with its retaining washer removed.

FIG. 3 is a view similar to FIG. 2, showing the hinge structure adjusted inwardly.

FIG. 4 is a similar fragmentary view showing the temple positioned for adjustment.

Referring to the exemplary embodiment of the invention, as shown in the accompanying drawings, the eyeglass frame is comprised of a frontal lens portion 11 and temples 12 (only one being shown) both preferably fashioned from plastic material. In the embodiment illustrated, the frontal lens portion includes an end portion 13 having, on its inside face, a hinge component 14. This component may be integrally molded with end portion 13 or it may be a separate metallic piece riveted or otherwise secured to said portion 13 as is common in the industry. In either event, the hinge component 14 is comprised of a substantially triangular-shaped flange projecting at right angles to the plane of the frontal lens portion 11 and provided with a pair of connected circular apertures 15 arranged in a line at an angle of about 45° from the plane of the frontal lens portion. It is to be noted also, that the line of the apertures 15 is coincidental to the inclined end edge 16 of the end portion 13.

The other hinge component 17 is carried by the temple 12. This comprises an arm 18 having on its free end an upstanding circular stud 19 which has a diameter to fit into either of the apertures 15, but has two of its opposed sides flattened, as at 21, so as to provide a width of slightly less than the width of a gap 22 provided at the juncture of the two circular apertures 15. The end 23 of the temple is formed at an angle to firmly abut the end portion edge 16 when the temple is in either extended position shown in FIGS. 2 or 3.

The stud 19 is extended through either of the apertures 15 and it may be rotatably secured therein as by means of a washer 24 and screw 25, or otherwise.

It should be quite evident that when the hinge assembly is arranged as illustrated in FIG. 2, the temple 12 is in its furthermost position from the side of the head. Now, should a tighter fit be required, the temple is rotated into substantially the position shown in FIG. 4, so as to bring the flat sides 21 of the stud into register with the gap 22 to thereby permit the hinge component 17 to be moved into the innermost aperture 15. The temple then is swung into its normal position, as shown in FIG. 3, but is now closer to the sides of the head so as to assure a more snug fit.

Although I have described a preferred embodiment of my invention, in considerable detail, it will be understood that the description thereof is intended to be illustrative, rather than restrictive, as details of the structure may be modified or changed without departing from the spirit or scope of the invention. Accordingly, I do not desire to be restricted to the exact construction described and shown.

I claim:

1. In combination, a spectacle frame to be worn by a user including a frontal lens portion, temples, and a hinge structure for attaching each temple to the frontal lens portion; wherein said hinge structure comprises a first component on the frontal lens portion extending rearwardly and substantially perpendicularly of said frontal lens portion when said frame is in position upon the head of a user; said first component including means defining a pair of circular apertures extending substantially vertically therethrough when said frame is in position upon the head of a user joined by a gap of less width than the diameter of the apertures, and a second component attached to each temple said second component including a circular stud dimensioned to rotatably fit into either one of said apertures and having flattened surfaces enabling it to be moved through the gap from one aperture to the other in order that said temples may be adjusted toward and away from the sides of the head of a user.

2. The combination recited in claim 1, wherein the apertures are arranged on a line 45° from the plane of the frontal lens portion.

* * * * *